(12) United States Patent  
Kochi et al.

(10) Patent No.: US 7,618,498 B2  
(45) Date of Patent: Nov. 17, 2009

(54) STEELS FOR HIGH-STRENGTH SPRINGS EXCELLENT IN COLD WORKABILITY AND QUALITY STABILITY

(75) Inventors: Takuya Kochi, Kobe (JP); Hiroshi Yaguchi, Kobe (JP); Nao Yoshihara, Kobe (JP)

(73) Assignee: (Kobe Steel, Ltd.), Kobe-shi (JP)

( * ) Notice: Subject to any disclaimer, the term of this patent is extended or adjusted under 35 U.S.C. 154(b) by 190 days.

(21) Appl. No.: 11/348,409

(22) Filed: Feb. 7, 2006

(65) Prior Publication Data

US 2006/0196584 A1    Sep. 7, 2006

(30) Foreign Application Priority Data

Mar. 3, 2005    (JP) .............................. 2005-059371

(51) Int. Cl.
*C22C 38/42* (2006.01)
*C22C 38/46* (2006.01)
*C22C 38/48* (2006.01)
*C22C 38/50* (2006.01)

(52) U.S. Cl. ...................... 148/328; 148/320; 148/908; 148/333; 148/335; 148/336

(58) Field of Classification Search ......... 148/333–336, 148/908, 328, 320, 598, 580, 654, 595

See application file for complete search history.

(56) References Cited

U.S. PATENT DOCUMENTS 3,844,848 A    10/1974    Stacey

| | | |
|---|---|---|
| 5,261,974 A | 11/1993 | Hyodo et al. |
| 5,286,312 A * | 2/1994 | Shimotsusa et al. ......... 148/335 |
| 5,776,267 A | 7/1998 | Nanba et al. |
| 5,846,344 A * | 12/1998 | Kawaguchi et al. ......... 148/333 |
| 2004/0129354 A1 | 7/2004 | Nagao et al. |

FOREIGN PATENT DOCUMENTS

CN    1305020 A    7/2001

(Continued)

OTHER PUBLICATIONS

Computer-generated English translation of Japanese patent 11-302729 dated Feb. 11, 1999, Yoshie Atsuhiko.*

(Continued)

*Primary Examiner*—Deborah Yee  
(74) *Attorney, Agent, or Firm*—Oblon, Spivak, McClelland, Maier & Neustadt, L.L.P.

(57) ABSTRACT

A steel for high-strength springs contains, on the mass basis, 0.35% to 0.65% of C, 1.4% to 2.5% of Si, 0.1% to 1.0% of Mn, 2.0% or less (exclusive of 0%) of Cr, 1.0% or less (exclusive of 0%) of Ni, 1.0% or less (exclusive of 0%) of Cu, 0.020% or less (exclusive of 0%) of P, 0.020% or less (exclusive of 0%) of S, 0.006% or less (exclusive of 0%) of N:, and 0.1% or less (exclusive of 0%) of Al, with the remainder being iron and inevitable impurities, in which Wp(Fe) and W(C) satisfy the following condition: Wp(Fe)>5×W(C), wherein Wp(Fe) is the content of Fe (percent by mass) constituting Fe-containing precipitates in the steel; and W(C) is the carbon content (percent by mass) of the steel. The steel is excellent in cold workability and quality stability.

8 Claims, 2 Drawing Sheets

FOREIGN PATENT DOCUMENTS

| | | |
|---|---|---|
| EP | 0 372 465 A1 | 6/1990 |
| EP | 0 657 557 A1 | 6/1995 |
| EP | 1 013 780 A1 | 6/2000 |
| JP | 62-196357 | 8/1987 |
| JP | 6-184679 | 7/1994 |
| JP | 6-184697 | 7/1994 |
| JP | 7-173577 | 7/1995 |
| JP | 9-310151 | 12/1997 |
| JP | 10-110247 | 4/1998 |
| JP | 11-199977 | 7/1999 |
| JP | 11-302729 | 11/1999 |
| JP | 11-315347 | 11/1999 |
| JP | 11-315348 | 11/1999 |
| JP | 11-315349 | 11/1999 |
| JP | 2000-45047 | 2/2000 |
| JP | 2000-239797 | 9/2000 |
| JP | 2004-263247 | 9/2004 |
| JP | 2004-360005 | 12/2004 |

OTHER PUBLICATIONS

Computer-generated English translation of Japanese patent 11-315347 dated Nov. 16, 1999, Kako Hiroshi.*
U.S. Appl. No. 11/296,299, filed Dec. 8, 2005, Minamida, et al.
U.S. Appl. No. 11/276,842, filed Mar. 16, 2006, Yoshihara.
U.S. Appl. No. 12/160,913, filed Jul. 15, 2008, Kochi, et al.
U.S. Appl. No. 12/097,313, filed Jul. 18, 2008, Yoshihara, et al.
U.S. Appl. No. 12/192,437, filed Aug. 15, 2008, Kochi, et al.

* cited by examiner

FIG. 1

Boundary levels: 15°
50.00 μm = 100 steps

FIG. 2

STEELS FOR HIGH-STRENGTH SPRINGS EXCELLENT IN COLD WORKABILITY AND QUALITY STABILITY

BACKGROUND OF THE INVENTION

1. Field of the Invention

The present invention relates to steels for high-strength springs excellent in cold workability and quality stability. More specifically, it relates to steels for high-strength springs which have excellent cold workability and highly stable quality after quenching/tempering in the manufacture of springs. The steels for springs according to the present invention can be used in manufacturing of steel parts in various fields such as the fields of transport machines such as automobiles and ships, and of industrial machines. The steels for springs will be described by taking automobile parts as a representative example of application.

2. Description of the Related Art

Demand for higher strength is made on steel materials constituting automobile parts such as valve springs and suspension springs accompanied with demand for reducing the size and thickness of automobile parts in order to reduce the weights of automobiles. The higher strengths of steel materials are generally achieved by increasing the contents of alloying elements. Such increased contents of alloying elements, however, reduce workability in the manufacture of springs. General manufacturing processes of springs are shown below. The increased contents of alloying elements of steel materials may often invite breakage during drawing and scalping processes for adjusting wire diameter and/or removing surface defects (hereinafter these processes are referred to as "pre-working processes" in contrast to a spring-coiling process.

<Manufacture of Hot-Coiled Springs>

A steel for springs is sequentially subjected to an acid pickling and coating process, a drawing and scalping process, a heating process, a hot coiling process, a quenching process, a tempering process, a prestressing and shot peening process, and a coating (painting) process and thereby yields a product spring.

<Manufacture of Cold-Coiled Springs>

A steel for springs is sequentially subjected to an acid pickling and coating process, a drawing and scalping process, a heating process, a quenching process, a tempering process, a cold coiling process, a annealing process, a prestressing and shot peening process, and a coating (painting) process and thereby yield a product spring.

As possible solutions to these problems, Japanese Laid-open (Unexamined) Patent Publication (JP-A) No. 2004-263247, for example, discloses a technique for preventing breakage during drawing process by controlling the contents of alloying elements to thereby control the hardness of a rolled steel. JP-A No. 06-184697 discloses a technique for ensuring cold workability by controlling component segregation of a steel.

Spring parts for use in automobiles are important parts from the viewpoint of safety and must maintain high quality over a long term to avoid damages such as chipping. To satisfy this requirement, steels for springs must maintain excellent properties even after quenching/tempering in the manufacture of springs. The conventional techniques, however, the stability of quality after quenching/tempering is not sufficiently considered, although improvements in processability in drawing are considered.

SUMMARY OF THE INVENTION

Under these circumstances, an object of the present invention is to provide steels for high-strength springs that exhibit excellent cold workability during pre-working (cold working) processes such as drawing and scalping in the manufacture of springs and stably show excellent properties after quenching/tempering.

The aspect of the present invention therefore resides in a steel for high-strength springs excellent in cold workability and quality stability, containing:

0.35 to 0.65 percent by mass of C, 1.4 to 2.5 percent by mass of Si, 0.1 to 1.0 percent by mass of Mn, 2.0 percent by mass or less (exclusive of 0 percent by mass) of Cr, 1.0 percent by mass or less (exclusive of 0 percent by mass) of Ni, 1.0 percent by mass or less (exclusive of 0 percent by mass) of Cu, 0.020 percent by mass or less (exclusive of 0 percent by mass) of P, 0.020 percent by mass or less (exclusive of 0 percent by mass) of S, 0.006 percent by mass or less (exclusive of 0 percent by mass) of N, and 0.1 percent by mass or less (exclusive of 0 percent by mass) of Al, in which Wp(Fe) and W(C) satisfy the following condition: $Wp(Fe) > 5 \times W(C)$, wherein Wp(Fe) is the content of Fe (percent by mass) constituting Fe-containing precipitates in the steel; and W(C) is the carbon content (percent by mass) of the steel.

In the steel, for high-strength springs according to the aspect of the present invention, bcc-Fe crystal grains in a metallographic structure preferably have an average grain size Dave of 20 μm or less and a largest grain size Dmax of 80 μm or less.

The steel for high-strength springs may further contain at least one selected from the group consisting of:

0.1 percent by mass or less (exclusive of 0 percent by mass) of Ti, 0.3 percent by mass or less (exclusive of 0 percent by mass) of V, and 0.1 percent by mass or less (exclusive of 0 percent by mass) of Nb, in which Wp(M) and W(M) satisfy the following condition: $Wp(M) > 0.5 \times W(M)$, wherein Wp(M) is the total content of Ti, V and Nb (percent by mass) constituting (Ti,V,Nb)-containing precipitates in the steel; and W (M) is the total content of Ti, V and Nb (percent by mass) of the steel.

The steel can further contain at least one of 0.5 percent by mass or less (exclusive of 0 percent by mass) of Mo and 0.001 percent by mass or less (exclusive of 0 percent by mass) of B as other elements.

The steels for springs according to the aspect of the present invention can efficiently yield, for example, spring parts for automobiles which exhibit stable properties over a long time without breakage during manufacturing processes.

Further objects, features and advantages of the present invention will become apparent from the following description of the preferred embodiments with reference to the attached drawings.

DESCRIPTION OF THE PREFERRED EMBODIMENTS

The present inventors made intensive investigations to provide steels for high-strength springs which exhibit excellent cold workability in pre-working (cold working) processes such as drawing and scalping and have stable properties even after quenching/tempering in the manufacture of springs.

They initially made detailed investigations on the relationship between properties of steels in pre-working processes and those after quenching/tempering in the manufacture of springs. They found that, when microdefects (also called working-induced defects) such as cracks in the steels occur during pre-working processes and even if the microdefects do not lead to breakage, the microdefects may invite impaired properties of the steel materials after quenching/tempering and may lead to early fracture of the products, and that this tendency markedly increases with increasing strengths of steel materials.

They further investigated on the microdefects and found that rolled steels (steels for springs) are generally controlled to have a metallographic structure as a mixture of ferrite and pearlite for better workability and are avoided to have supercooled structures such as martensite and bainite which cause fracture, but even when the metallographic structure is controlled to be a substantially two-phase structure including ferrite and pearlite, microdefects may occur during pre-working.

Consequently, they made further investigations on causes of microdefects and found that steels for high-strength springs comprise relatively large amounts of alloying elements as described above, and such alloying elements may be easily enriched in Fe-containing precipitates (iron-based carbides mainly comprising cementite) in pearlite to thereby reduce the deformability of the Fe-containing precipitates and that this mainly causes microdefects. Based on these findings, they also found that it is important to increase the Fe content of the Fe-containing precipitates in the steel to thereby improve deformability so as to inhibit or reduce the microdefects.

The following points have been considered in the increase in Fe content of Fe-containing precipitates in the steel.

(1) Assuming that the metallographic structure of a rolled steel is a mixture of ferrite and pearlite, the amount of precipitated Fe-containing precipitates constituting pearlite is determined by the carbon content of the steel. If the steel further comprises supercooled structures in addition to ferrite and pearlite, the amount of the precipitated Fe-containing precipitates becomes significantly lower than that calculated based on the carbon content.

(2) The Fe content of Fe-containing precipitates in the steel decreases when alloying elements are added.

Based on these considerations, the present inventors found that, for ensuring workability during pre-working processes, for inhibiting microdefects which may occur during the pre-working, and for thereby prevent properties from impairing after quenching/tempering, it is important to control the relationship between the content of Fe constituting Fe-containing precipitates in the steel and the carbon content of the steel. They consequently found that this can be achieved by satisfying the condition: $Wp(Fe) > 5 \times W(C)$, wherein $Wp(Fe)$ is the content of Fe (percent by mass) constituting Fe-containing precipitates (iron-based carbides mainly comprising cementite) in the steel; and $W(C)$ is the carbon content (percent by mass) of the steel. By thus controlling the content of Fe constituting Fe-containing precipitates in the steel and the carbon content of the steel, structures including minimized supercooled structures can be obtained. When the alloying elements are enriched in Fe-containing precipitates or form alloy carbides, the condition: $Wp(Fe) > 5 \times W(C)$ may not be satisfied even when supercooling does not occur. In addition, steels for springs having improved cold workability during pre-working processes and reduced microdefects can be obtained, since the Fe-containing precipitates in the steel have a higher Fe content. The parameters $Wp(Fe)$ and $W(C)$ preferably satisfy the condition: $Wp(Fe) > 7 \times W(C)$ When the steels further comprise Ti, V, and/or Nb, these elements should be considered. If the steels contain dissolved nitrogen, the steels have impaired deformability. To avoid this, Ti and/or Nb that easily forms nitrides with nitrogen is added to thereby fix the dissolved nitrogen as nitrides. Thus, the deformability of the steel materials can be improved. Additionally, carbonitrides of Ti, V, and Nb effectively refine the structure and contribute to increased ductility. Titanium (Ti) acts to form sulfides with S to thereby render S harmless. If Ti, V, and Nb are present as solid-solutions, however, supercooled structures may often form.

Thus, most of Ti, V, and Nb, if added, should preferably form precipitates such as carbonitrides to reduce supercooled structures caused by these elements, to ensure satisfactory cold workability and to inhibit microdefects. Consequently, parameters $Wp(M)$ and $W(M)$ preferably satisfy the condition: $Wp(M) > 0.5 \times W(M)$ and more preferably satisfy the condition: $Wp(M) > 0.7 \times W(M)$, wherein $Wp(M)$ is the total content of Ti, V and Nb (percent by mass) constituting (Ti,V, Nb)-containing precipitates (precipitates containing at least one selected from the group consisting of Ti, V and Nb) in the steel; and $W(M)$ is the total content of Ti, V and Nb (percent by mass) of the steel.

For reliably inhibiting the breakage and microdefects during pre-working (cold working), the control the structure of a matrix is recommended, in addition to the control of precipitates, to thereby mitigate stress concentration. The present inventors found that coarse crystal grains of the matrix cause breakage and microdefects during drawing, and that the presence of coarse crystal grains often induce breakage and/or microdefects even if the average crystal grain size is small. To avoid breakage and microdefects, the average grain size and the largest grain size of crystal grains of the matrix are controlled according to the present invention.

Specifically, they found that breakage and microdefects during pre-working (cold working) can be prevented to thereby maintain excellent properties after quenching/tempering by allowing bcc-Fe crystal grains as a metallic matrix structure to have an average grain size Dave of 20 μm or less and a largest grain size Dmax of 80 μm or less. The smaller are the average grain size Dave and the largest grain size Dmax, the better the advantages are. The average grain size Dave is more preferably 15 μm or less, and the largest grain size Dmax is more preferably 60 μm or less.

The present invention is characterized by controlling morphologies of the precipitates and the matrix structure as above. The composition of the steel must be controlled as follows for easily achieving such morphologies.

<C Content: 0.35 to 0.65 Percent by Mass>

Carbon (C) is an element necessary for securing high strength, and the lower limit of its content is 0.35 percent by mass or more, preferably 0.38 percent by mass or more, and more preferably 0.40 percent by mass or more. An excessively high carbon content, however, may adversely affect the ductility. Accordingly, the upper limit of the carbon content is defined as 0.65 percent by mass in the present invention, and it is preferably 0.61 percent by mass, and more preferably 0.60 percent by mass.

<Si Content: 1.4 to 2.5 Percent by Mass>

Silicon (Si) is an element effective for improving sag resistance necessary for springs. The Si content must be 1.4 percent by mass or more for securing sag resistance necessary for springs having such high strengths as the present invention intends.

The Si content is preferably 1.7 percent by mass or more, and more preferably 1.8 percent by mass or mote. However, Si also serve to accelerate decarbonization, and excessive Si accelerates the formation of a decarbonized layer on the surface of the steel. This requires a peeling process for removing the decarbonized layer and is disadvantageous in manufacturing cost.

Accordingly, the upper limit of the Si content is defined as 2.5 percent by mass. The Si content is preferably 2.3 percent by mass or less, and more preferably 2.2 percent by mass or less.

<Mn Content: 0.1 to 1.0 Percent by Mass>

Manganese (Mn) is a useful element that fixes S, a harmful element in the steel, to form harmless MnS. To effectively exhibit this advantage, the Mn content should be 0.1 percent by mass or more. It is preferably 0.15 percent by mass or more, and more preferably 0.20 percent by mass or more. However, excessive Mn may cause segregation sites, thereby induce variation in the steel, and cause supercooled structures. Manganese is often enriched in cementite to thereby reduce the deformability of cementite as described above. Therefore, the Mn content is defined as 1.0 percent by mass or less and is preferably 0.7 percent by mass or less, and more preferably 0.4 percent by mass or less.

<Cr Content: 2.0 Percent by Mass or Less (Exclusive of 0 Percent by Mass)>

From the viewpoint of increasing cold workability, the Cr content is preferably low. Chromium (Cr), however, is an element effective for securing strength after tempering and increasing corrosion resistance and is particularly important for suspension springs that require high corrosion resistance. When these advantages should be exhibited, the Cr content is preferably 0.2 percent by mass or more. However, an excessively high Cr content may often invite the formation of supercooled structures and decreased deformability and impaired cold workability, since Cr is enriched in cementite. In addition, excessive Cr often causes Cr carbides other than cementite, which leads to unbalance between the strength and the ductility. Accordingly, the Cr content should be 2.0 percent by mass or less, and is preferably 1.8 percent by mass or less, and more preferably 1.7 percent by mass or less.

<Ni Content: 1.0 Percent by Mass or Less (Exclusive of 0 Percent by Mass)>

Nickel (Ni) is reduced when lower cost is intended, and the lower limit of Ni content is not defined herein, but the Ni content is preferably 0.1 percent by mass or more for inhibiting decarbonization of surface layer and for increasing the corrosion resistance. An excessively high Ni content, however, may cause supercooled structures or residual austenite in the rolled steel to thereby impair the properties of the steel. Accordingly, the upper limit of the Ni content is defined as 1.0 percent by mass. For cost reduction, the Ni content is preferably 0.7 percent by mass or less, and more preferably 0.6 percent by mass or less.

<Cu Content: 1.0 Percent by Mass or Less (Exclusive of 0 Percent by Mass)>

Copper (Cu) is an element effective for reducing decarbonization of surface layer and increasing the corrosion resistance. To exhibit these advantages, the Cu content is preferably 0.1 percent by mass or more. An excessively high Cu content, however, may invite supercooled structures and cracking during hot working.

Accordingly, the upper limit of the Cu content is defined as 1.0 percent by mass. The Cu content is preferably 0.5 percent by mass or less, and more preferably 0.4 percent by mass or less from the viewpoint of cost reduction.

<P Content: 0.020 Percent by Mass or Less (Exclusive of 0 Percent by Mass)>

Phosphorus (P) is a harmful element that impair toughness/ductility of the steel and must be minimized. The upper limit of the P content is therefore defined as 0.020 percent by mass. The P content is preferably reduced to 0.010 percent by mass or less, and more preferably 0.008 percent by mass or less.

<S Content: 0.020 Percent by Mass or Less (Exclusive of 0 Percent by Mass)>

Sulfur (S), like P, is a harmful element that impair toughness/ductility of the steel and must be minimized. The P content should be 0.020 percent by mass or less and is preferably 0.010 percent by mass or less, and more preferably 0.008 percent by mass or less.

<N Content: 0.006 Percent by Mass or Less (Exclusive of 0 Percent by Mass)>

Nitrogen (N) forms nitrides with Al, Ti, and the like to thereby refine the structure, but if it exists as dissolved nitrogen, it impair the toughness/ductility and the resistance against hydrogen-induced embrittlement of the steel. For reducing the dissolved nitrogen, the upper limit of the N content is defined as 0.006 percent by mass. The N content is preferably 0.005 percent by mass or less, and more preferably 0.004 percent by mass or less.

<Al Content: 0.1 Percent by Mass or Less (Exclusive of 0 Percent by Mass)>

Aluminum (Al) is added mainly as a deoxidization element. It also forms AlN with N to thereby render the dissolved nitrogen harmless and to yield finer structures. For the purpose of fixing the dissolved nitrogen, the Al content is preferably more than two times as much as the N content (percent by mass). However, Al accelerates decarbonization as Si, and the Al content in spring steels containing a large amount of Si must be reduced. Consequently, the Al content is defined as 0.1 percent by mass or less and is preferably 0.07 percent by mass or less, and more preferably 0.05 percent by mass or less.

The elements to be contained according to the present invention are as above, and the remainder is substantially Fe. However, the steel may comprise inevitable impurities derived typically from raw materials, other materials, and manufacturing facilities and can positively comprise other elements as follows within ranges not adversely affecting the advantages of the present invention.

<Ti Content: 0.1 Percent by Mass or Less (Exclusive of 0 Percent by Mass)>

Titanium (Ti) forms carbonitrides and sulfides with C, N, and S to thereby render these elements harmless. Additionally, it forms the carbonitrides to thereby yield finer structures. To exhibit these advantages, the Ti content is preferably 0.02 percent by mass or more and higher than [3.5×N (percent by mass)]. However, an excessively high Ti content may invite coarse titanium carbonitride to thereby impair the toughness/ductility. The upper limit of the Ti content is preferably 0.1 percent by mass and more preferably 0.08 percent by mass.

<V Content: 0.3 Percent by Mass or Less (Exclusive of 0 Percent by Mass)>

Vanadium (V) is an element that contributes to finer structures by forming carbonitrides mainly with C and N. To exhibit these advantages, the V content is preferably 0.02 percent by mass or more and more preferably 0.05 percent by mass or more. However, excessive V causes supercooled structures. Accordingly, the upper limit of the V content is preferably 0.3 percent by mass, and more preferably 0.2 percent by mass for cost reduction.

<Nb Content: 0.1 Percent by Mass or Less (Exclusive of 0 Percent by Mass)>

Niobium (Nb) is also an element that contributes to finer structures by forming carbonitrides mainly with C and N. To exhibit these advantages, the Nb content is preferably 0.003 percent by mass or more and more preferably 0.005 percent by mass or more. However, an excessively high Nb content causes coarse carbonitrides to thereby impair the toughness/ductility of the steel. Consequently, the upper limit of the Nb content is preferably 0.1 percent by mass. It is more preferably 0.07 percent by mass from the viewpoint of cost reduction.

<Mo Content: 0.5 Percent by Mass or Less (Exclusive of 0 Percent by Mass)>

Molybdenum (Mo) is also an element that contributes to finer structures by forming carbonitrides mainly with C and N. To exhibit these advantages, the Mo content is preferably 0.1 percent by mass or more. However, excessive Mo may cause supercooled structures. Consequently, the upper limit of the Mo content is preferably 0.5 percent by mass and more preferably 0.3 percent by mass for sufficiently inhibiting supercooled structures.

<B Content: 0.001 Percent by Mass or Less (Exclusive of 0 Percent by Mass)>

Boron (B) forms nitrides with N and thereby renders N harmless. When B is present as a solid solution, fracture at prior austenite grain boundaries after quenching/tempering can be inhibited. To exhibit these advantages, the B content is preferably 0.0003 percent by mass or more. However, excessive boron forms coarse borocarbides to impair the properties of the steel. B is an element that markedly increase quenching properties, and if added excessively, the rolled steel may often include supercooled structures. Accordingly, the upper limit of the B content is preferably set at 0.001 percent by mass and more preferably set at 0.0008 percent by mass for inhibiting supercooling.

The present invention does not limit manufacturing conditions. The steels for springs according to the present invention can be, for example, steel materials obtained by ingot making or rolled steels obtained by rolling the steel materials. The heat treatment herein is preferably conducted in the following manner so as to control the structure of the steel to the specified structure, to increase the proportion of Fe constituting Fe-containing precipitates in the steel and to reduce supercooled structures.

When hot rolling is conducted, it is recommended to control the temperature of steel wire to 900° C. to 1050° C. after hot rolling and carrying out cooling to 650° C. at an average cooling rate of 20° C./sec or less for reducing supercooled structures. At an average cooling rate exceeding 20° C./sec, the steel material having the above-specified composition may often invite supercooled structures. The average cooling rate is more preferably set at 10° C./sec or less for further reducing supercooled structures. However, an excessively low cooling rate may induce coarse crystal grains of the matrix and invites surface layer decarbonization to thereby impair productivity in the manufacture of springs. The average cooling rate is therefore preferably 2° C./sec or more. This cooling rate is applied to cooling to 650° C. If cooling is carried out to temperatures below 650° C. at the above-specified cooling rate, Fe-containing precipitates such as cementite and precipitates such as (Ti,V,Nb)-containing precipitates may not be obtained.

After cooling to 650° C. at the above-specified cooling rate, the cooling is preferably controlled for controlling precipitates. Specifically, the steel is preferably held to temperatures of 650° C. or lower and 580° C. or higher. The precipitates mainly comprising cementite ($M_3C$ wherein M is Fe and alloying elements) tend to precipitate at temperatures of 650° C. to 580° C. during cooling process after hot rolling. In the steel according to the present invention having the above-specified composition, precipitates deposit slowly, and the steel is preferably held to temperatures between 650° C. to 580° C. for 100 seconds or longer for securing the deposition of the precipitates. The steel is more preferably held to these temperatures for 120 seconds or longer and more preferably for 600 seconds or longer for increasing precipitates.

The holding time at the temperatures affects the compositional proportions of alloying elements in Fe-containing precipitates in the steel. When the steel is held to the above-specified temperatures for an excessively long time, the proportion of Fe of Fe-containing precipitates in the steel may reduce. Additionally, an excessively long holding time may invite deposition of alloy precipitates such as $M_7C_3$ wherein M is Fe and various alloying elements other than cementite, and these alloy precipitates may impair the properties of the steel. The holding time at the temperatures is preferably 1200 seconds or shorter and more preferably shorter than 1000 seconds.

To allow precipitates of Ti, V, and Nb, if contained, represented by MX, wherein M is Ti, V, or Nb; and X is C or N, at the above-specified temperatures, the holding time is preferably set to 600 seconds or longer. However, an excessively long holding time may reduce the proportion of Fe in cementite as described above, and the holding time at the temperatures is preferably 1200 seconds or shorter.

The cooling control in a hot rolling process is described above as an example. The same advantage, however, can be obtained by heating the steel and conducting the same cooling control instead of the cooling control in a hot rolling process.

Heating and finish rolling of a billet in hot rolling can be carried out according to conventional procedures. For example, hot rolling is conducted by heating the billet at 1100° C. or higher and 1250° C. or lower, and then finish rolling is conducted at a temperature of 900° C. or lower.

Since the steels for springs according to the present invention show excellent workability in pre-working process, have high strengths in terms of tensile strength of 1900 MPa or more and show stable properties even after quenching/tempering, they are useful for the manufacture of springs used in the fields typically of automobiles and industrial machines. They are optimally used for the manufacture of springs for use in reversion mechanisms, such as suspension springs of suspension systems, valve springs of car engines, clutch springs, and braking springs.

The present invention will be illustrated in further detail with reference to several examples. It is to be noted that the following are only examples, the present invention is not limited by the following examples, and various changes and modifications are possible therein without departing from the teaching and scope of the present invention.

EXAMPLES

A series of steels having the compositions in Table 1 were manufactured by ingot making and subjected to hot rolling. In the hot rolling, billets were heated at 1150° C. or higher and 1250° C. or lower in a heating furnace and rolled at a finish rolling temperature of about 1100° C. to a diameter of 13 to 14 mm. After hot rolling, the temperatures of steel wires were controlled to 950° C. to 1050° C. by cooling with water and the steel wires were placed on a conveyer belt and were cooled under control, in which the steel wires were cooled to 650° C. under the conditions in Table 2 and then held to temperatures of 650° C. or lower and 580° C. or higher. The precipitates and structures of the resulting steel wires (rolled steels) were evaluated in the following manner.

TABLE 1

| No. | C | Si | Mn | P | S | Cr | Ni | Cu | Al | N | Ti | V | Nb | Mo | B |
|---|---|---|---|---|---|---|---|---|---|---|---|---|---|---|---|
| A1 | 0.38 | 2.33 | 0.15 | 0.007 | 0.005 | 1.88 | 0.52 | 0.50 | 0.0287 | 0.0028 | 0.070 | — | 0.052 | — | — |
| A2 | 0.38 | 2.30 | 0.19 | 0.006 | 0.004 | 1.89 | 0.62 | 0.61 | 0.0328 | 0.0027 | — | — | — | — | — |
| A3 | 0.39 | 2.32 | 0.17 | 0.009 | 0.008 | 1.21 | 0.71 | 0.32 | 0.0332 | 0.0013 | 0.026 | 0.081 | — | — | 0.0002 |
| A4 | 0.44 | 1.98 | 0.22 | 0.011 | 0.012 | 1.82 | 0.30 | 0.21 | 0.0310 | 0.0033 | 0.078 | 0.088 | — | — | — |
| A5 | 0.45 | 2.00 | 0.81 | 0.014 | 0.016 | 0.70 | 0.22 | 0.02 | 0.0588 | 0.0052 | 0.080 | — | 0.022 | — | 0.0007 |
| A6 | 0.50 | 2.19 | 0.78 | 0.008 | 0.007 | 0.72 | 0.20 | 0.20 | 0.0327 | 0.0027 | — | 0.230 | 0.050 | — | 0.0003 |
| A7 | 0.51 | 2.21 | 0.15 | 0.006 | 0.004 | 0.22 | 0.33 | 0.30 | 0.0318 | 0.0024 | 0.051 | — | — | 0.32 | — |
| A8 | 0.52 | 1.48 | 0.21 | 0.009 | 0.007 | 1.78 | 0.01 | 0.01 | 0.0421 | 0.0041 | 0.052 | 0.182 | — | — | 0.0008 |
| A9 | 0.55 | 1.88 | 0.30 | 0.010 | 0.009 | 1.05 | 0.01 | 0.21 | 0.0015 | 0.0029 | 0.050 | 0.198 | — | 0.18 | 0.0005 |
| A10 | 0.57 | 1.79 | 0.20 | 0.007 | 0.008 | 0.77 | 0.21 | 0.01 | 0.0339 | 0.0031 | 0.079 | 0.188 | — | — | — |
| A11 | 0.57 | 2.22 | 0.21 | 0.011 | 0.008 | 1.20 | 0.18 | 0.01 | 0.0350 | 0.0042 | 0.077 | — | 0.055 | — | 0.0003 |
| A12 | 0.60 | 2.33 | 0.18 | 0.009 | 0.010 | 0.21 | 0.60 | 0.62 | 0.0914 | 0.0038 | 0.071 | 0.211 | 0.020 | — | 0.0003 |
| A13 | 0.61 | 1.97 | 0.33 | 0.007 | 0.007 | 0.70 | 0.20 | 0.02 | 0.0326 | 0.0022 | 0.028 | — | 0.051 | 0.40 | — |
| A14 | 0.63 | 1.56 | 0.21 | 0.005 | 0.004 | 1.02 | 0.20 | 0.19 | 0.0347 | 0.0035 | 0.072 | 0.151 | 0.050 | 0.41 | — |
| A15 | 0.31 | 2.35 | 0.22 | 0.006 | 0.004 | 1.22 | 0.67 | 0.60 | 0.0307 | 0.0044 | 0.071 | — | 0.055 | — | — |
| A16 | 0.40 | 2.81 | 0.89 | 0.012 | 0.014 | 1.19 | 0.70 | 0.52 | 0.0349 | 0.0038 | 0.088 | 0.219 | — | — | 0.0003 |
| A17 | 0.40 | 2.02 | 0.19 | 0.025 | 0.014 | 1.85 | 0.22 | 0.21 | 0.0322 | 0.0033 | — | 0.180 | — | — | — |
| A18 | 0.41 | 1.82 | 0.22 | 0.014 | 0.026 | 1.20 | 0.01 | 0.02 | 0.0337 | 0.0034 | — | — | — | — | — |
| A19 | 0.46 | 1.05 | 0.88 | 0.011 | 0.010 | 2.44 | 0.01 | 0.02 | 0.0343 | 0.0031 | 0.051 | 0.178 | — | — | — |
| A20 | 0.47 | 2.21 | 1.62 | 0.012 | 0.010 | 1.27 | 0.21 | 0.10 | 0.0425 | 0.0042 | 0.052 | — | — | 0.78 | — |
| A21 | 0.47 | 2.22 | 0.20 | 0.008 | 0.009 | 0.70 | 1.30 | 1.21 | 0.0430 | 0.0041 | 0.051 | — | 0.022 | — | — |
| A22 | 0.51 | 1.89 | 0.22 | 0.008 | 0.006 | 0.65 | 0.53 | 0.31 | 0.0364 | 0.0038 | 0.050 | 0.348 | — | — | 0.0005 |
| A23 | 0.52 | 1.88 | 0.21 | 0.007 | 0.006 | 0.63 | 0.55 | 0.27 | 0.0478 | 0.0092 | 0.141 | — | 0.052 | — | 0.0008 |
| A24 | 0.52 | 1.90 | 0.21 | 0.009 | 0.007 | 0.64 | 0.73 | 0.30 | 0.5992 | 0.0099 | 0.080 | — | 0.055 | — | 0.0007 |
| A25 | 0.55 | 2.21 | 0.17 | 0.008 | 0.008 | 1.79 | 0.54 | 0.41 | 0.0389 | 0.0042 | 0.050 | 0.202 | — | 0.31 | 0.0021 |
| A26 | 0.70 | 2.18 | 0.77 | 0.003 | 0.004 | 1.20 | 0.48 | 0.34 | 0.0015 | 0.0025 | 0.031 | — | — | — | 0.0005 |
| A27 | 0.71 | 2.20 | 0.21 | 0.005 | 0.005 | 1.82 | 0.10 | 0.11 | 0.0020 | 0.0030 | 0.026 | 0.078 | 0.022 | — | 0.0008 |

*The remainder being iron and inevitable impurities.

TABLE 2

| Sample No. | Steel No. | Cooling rate after placement ° C./sec. | Holding time at 650° C. to 580° C. sec. | Remarks |
|---|---|---|---|---|
| 1 | A1 | 6 | 600 | |
| 2 | | 6 | 600 | |
| 3 | | 6 | 60 | Supercooling |
| 4 | | 5 | 1200 | |
| 5 | A2 | 3 | 900 | |
| 6 | | 3 | 900 | |
| 7 | | 4 | 1200 | |
| 8 | A3 | 10 | 900 | |
| 9 | A4 | 6 | 600 | |
| 10 | | 6 | 600 | |
| 11 | A5 | 6 | 600 | |
| 12 | A6 | 5 | 600 | |
| 13 | | 5 | 60 | Supercooling |
| 14 | A7 | 5 | 900 | |
| 15 | A8 | 5 | 600 | |
| 16 | | 5 | 600 | |
| 17 | | 6 | 1200 | |
| 18 | | 21 | 1200 | Supercooling |
| 19 | A9 | 5 | 600 | |
| 20 | A10 | 6 | 120 | |
| 21 | A11 | 6 | 600 | |
| 22 | A12 | 5 | 600 | |
| 23 | A13 | 5 | 900 | |
| 24 | A14 | 6 | 900 | |
| 25 | | 5 | 1800 | |
| 26 | | 22 | 600 | Supercooling |
| 27 | A15 | 5 | 600 | |
| 28 | A16 | 1 | 600 | Much decarbonization |
| 29 | A17 | 5 | 600 | |
| 30 | | 5 | 600 | |
| 31 | A18 | 2 | 600 | |

TABLE 2-continued

| Sample No. | Steel No. | Cooling rate after placement °C./sec. | Holding time at 650° C. to 580° C. sec. | Remarks |
|---|---|---|---|---|
| 32 | | 2 | 600 | |
| 33 | A19 | 5 | 600 | |
| 34 | | 5 | 600 | |
| 35 | A20 | 7 | 600 | Supercooling |
| 36 | A21 | 6 | 600 | Supercooling |
| 37 | A22 | 5 | 600 | Supercooling |
| 38 | A23 | 5 | 600 | |
| 39 | A24 | 1 | 600 | Much decarbonization |
| 40 | A25 | 8 | 600 | Supercooling |
| 41 | A26 | 5 | 600 | Supercooling |
| 42 | A27 | 5 | 600 | Supercooling |

[Precipitates/Structure Evaluation]

As samples for evaluating precipitates and structure, two rings were sampled at a center part in a longitudinal direction of a hot-rolled steel wire coil.

For evaluating precipitates, precipitates in the steel were collected by electroextraction. Initially, the sample was subjected to wet cutting and surface-machining and thereby yielded a cylindrical sample for evaluating precipitates, having a diameter of 8 mm and a length of 20 mm. The sample was immersed in an electrolyte (10% AA electrolyte), energized at 100 mA for five hours to thereby electrolyze metallic Fe in the matrix, and precipitates in the steel present were collected as a residue from the electrolyte using a 0.1-µm mesh membrane filter available from Advantech Toyo Kaisha, Ltd.

The species of the collected precipitates were identified by elemental analysis using X-ray diffraction and ICP emission spectroscopic analysis. The X-ray diffraction was carried out using the RINT 1500 X-ray diffractometer available from Rigaku Corporation and using Cu as a target at a scanning rate of 2'/min, a sampling width of 0.02° and a measurement range in terms of 2θ of 10° to 90°.

The Fe content of the residue (precipitates) wFe (g) collected in the elemental analysis, and the change in mass of the sample between before and after electrolysis ΔW (g) were measured. Then, the content of Fe (percent by mass) constituting the precipitates Wp (Fe) was determined by calculation according to the following equation: Wp(Fe)=wFe/ΔW×100. In this example, three or more samples for evaluating precipitates were prepared from the ring sample, the parameters were measured, and the averages of the obtained Wp(Fe)s were determined.

On samples containing Ti, V, and/or Nb, precipitates were collected as a residue after electroextraction, and the content of Fe constituting the precipitates Wp(Fe) (percent by mass), and the total content of Ti, V and Nb constituting the precipitates Wp(M) (percent by mass) were determined in the same manner as above.

As the structure evaluation, the size distribution of crystal grains was determined using SEM/EBSP (electron back scattering pattern) techniques. More specifically, the ring sample was wet-cut to yield a sample 10 mm long as a sample for structure evaluation. As a sample for EBSP determination, the obtained sample was subjected to wet polishing, buffing, and chemical polishing to thereby yield a sample with minimized strain and unevenness due to polishing. The polishing processes were conducted so that a center part of the diameter surface in a rolling direction of the steel wire can be observed. EBSP was conducted at a center part of wire diameter of the resulting sample. The determination was conducted at a measurement step of 0.5 µm or less with a total measured area (total measured area of the three or more samples) per each steel wire of 60000 µm² or more. After the determination, crystal orientation was analyzed. For higher reliability of the analysis, data having an average confidence index (CI) of 0.3 or more were employed, and data points having a CI of 0.1 or more were used in the analysis. As a result of the crystal orientation analysis of bcc-Fe, regions surrounded by the boundaries at an orientation angle difference of 15° or more were obtained as "crystal grains" as an analysis result (boundary map). An example of the analysis results is shown in FIG. 1.

Figure 1:
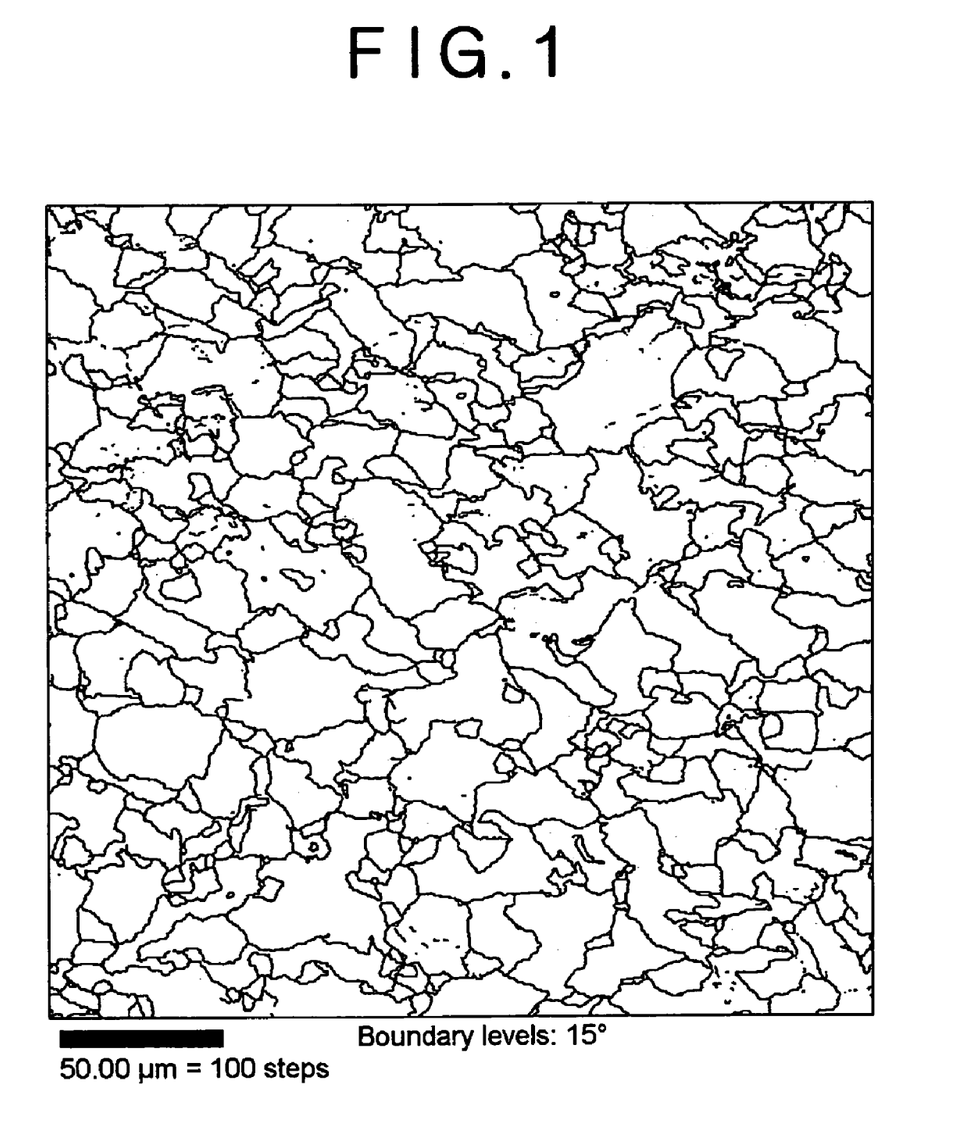
FIG. 1 shows an example of a boundary map of a steel according to the present invention analyzed by SEM/EBSP.

A boundary map as shown in FIG. 1 was analyzed using the image analyzing software "Image-Pro", and the sizes of the crystal grains were determined. More specifically, the areas of the regions (crystal grains) surrounded by boundaries in the boundary map were determined using Image-Pro. Next, the diameters of circles having the same areas as the crystal grains were determined by approximate calculation, and these diameters were assumed to be crystal grain diameters of the crystal grains.

In the structure evaluation, three or more samples for structure evaluation were prepared from the ring sample, were evaluated, and the average grain size Dave and the largest grain size Dmax of each steel were determined. The results are shown in Table 3.

TABLE 3

| Sample No. | Extracted precipitates in rolled steel | Wp(Fe) percent by mass | 5 × W(C) percent by mass | Wp(M) percent by mass | 0.5 × W(M) percent by mass | Average grain size of rolled steel µm | Maximum grain size of rolled steel µm |
|---|---|---|---|---|---|---|---|
| 1 | $M_3C$, MX, MnS, $Ti_4C_2S_2$ | 2.170 | 1.900 | 0.102 | 0.061 | 10.3 | 42.3 |
| 2 | $M_3C$, MX, MnS, $Ti_4C_2S_2$ | 2.170 | 1.900 | 0.102 | 0.061 | 10.3 | 42.3 |
| 3 | $M_3C$, MX, MnS, $Ti_4C_2S_2$ | 0.450 | 1.900 | 0.099 | 0.061 | — | — |
| 4 | $M_3C$, $M_7C_3$, MX, MnS, $Ti_4C_2S_2$ | 1.670 | 1.900 | 0.110 | 0.061 | 10.7 | 44.5 |
| 5 | $M_3C$, MnS | 2.330 | 1.900 | — | 0 | 16.5 | 81.8 |
| 6 | $M_3C$, MnS | 2.330 | 1.900 | — | 0 | 16.5 | 81.8 |
| 7 | $M_3C$, $M_7C_3$, MnS | 1.780 | 1.900 | — | 0 | 13.8 | 77.5 |
| 8 | $M_3C$, MX, MnS, $Ti_4C_2S_2$ | 2.440 | 1.950 | 0.062 | 0.0535 | 9.2 | 48.9 |
| 9 | $M_3C$, MX, MnS, $Ti_4C_2S_2$ | 2.410 | 2.200 | 0.089 | 0.083 | 8.6 | 43.2 |
| 10 | $M_3C$, MX, MnS, $Ti_4C_2S_2$ | 2.410 | 2.200 | 0.089 | 0.083 | 8.6 | 43.2 |
| 11 | $M_3C$, MX, MnS, $Ti_4C_2S_2$ | 3.220 | 2.250 | 0.092 | 0.051 | 9.8 | 51.3 |
| 12 | $M_3C$, MX, MnS | 2.840 | 2.500 | 0.151 | 0.14 | 7.9 | 35.2 |
| 13 | $M_3C$, MX, MnS | 0.320 | 2.500 | 0.078 | 0.14 | — | — |
| 14 | $M_3C$, MX, MnS, $Ti_4C_2S_2$ | 4.860 | 2.550 | 0.043 | 0.0255 | 9.5 | 48.8 |

TABLE 3-continued

| Sample No. | Extracted precipitates in rolled steel | Wp(Fe) percent by mass | 5 × W(C) percent by mass | Wp(M) percent by mass | 0.5 × W(M) percent by mass | Average grain size of rolled steel μm | Maximum grain size of rolled steel μm |
|---|---|---|---|---|---|---|---|
| 15 | $M_3C$, MX, MnS, $Ti_4C_2S_2$ | 2.950 | 2.600 | 0.134 | 0.117 | 8.2 | 43.5 |
| 16 | $M_3C$, MX, MnS, $Ti_4C_2S_2$ | 2.950 | 2.600 | 0.134 | 0.117 | 8.2 | 43.5 |
| 17 | $M_3C$, $M_7C_3$, MX, MnS, $Ti_4C_2S_2$ | 2.500 | 2.600 | 0.216 | 0.117 | 7.9 | 41.2 |
| 18 | $M_3C$, $M_7C_3$, MX, MnS, $Ti_4C_2S_2$ | 2.230 | 2.600 | 0.187 | 0.117 | — | — |
| 19 | $M_3C$, MX, MnS, $Ti_4C_2S_2$ | 4.280 | 2.750 | 0.139 | 0.124 | 8.4 | 40.6 |
| 20 | $M_3C$, MX, MnS, $Ti_4C_2S_2$ | 5.460 | 2.850 | 0.122 | 0.1335 | 8.8 | 42.3 |
| 21 | $M_3C$, MX, MnS, $Ti_4C_2S_2$ | 5.110 | 2.850 | 0.118 | 0.066 | 8.2 | 38.7 |
| 22 | $M_3C$, MX, MnS, $Ti_4C_2S_2$ | 5.530 | 3.000 | 0.176 | 0.151 | 7.6 | 38.2 |
| 23 | $M_3C$, MX, $M_2X$, MnS, $Ti_4C_2S_2$ | 3.880 | 3.050 | 0.065 | 0.0395 | 9.2 | 49.6 |
| 24 | $M_3C$, MX, $M_2X$, MnS, $Ti_4C_2S_2$ | 3.470 | 3.150 | 0.154 | 0.1365 | 7.5 | 38.5 |
| 25 | $M_3C$, $M_7C_3$, MX, $M_2X$, MnS, $Ti_4C_2S_2$ | 2.880 | 3.150 | 0.199 | 0.1365 | 7.8 | 38.8 |
| 26 | $M_3C$, MX, $M_2X$, MnS, $Ti_4C_2S_2$ | 1.130 | 3.150 | 0.129 | 0.1365 | — | — |
| 27 | $M_3C$, MX, MnS, $Ti_4C_2S_2$ | 2.290 | 1.550 | 0.103 | 0.063 | 10.9 | 52.8 |
| 28 | $M_3C$, MX, MnS, $Ti_4C_2S_2$ | 3.100 | 2.000 | 0.177 | 0.1535 | — | — |
| 29 | $M_3C$, MX, MnS | 2.320 | 2.000 | 0.135 | 0.09 | 9.2 | 48.6 |
| 30 | $M_3C$, MX, MnS | 2.320 | 2.000 | 0.135 | 0.09 | 9.2 | 48.6 |
| 31 | $M_3C$, MnS | 2.280 | 2.050 | — | 0 | 21.2 | 86.3 |
| 32 | $M_3C$, MnS | 2.280 | 2.050 | — | 0 | 21.2 | 86.3 |
| 33 | $M_3C$, $M_7C_3$, MX, MnS, $Ti_4C_2S_2$ | 1.890 | 2.300 | 0.107 | 0.1145 | 8.2 | 40.5 |
| 34 | $M_3C$, $M_7C_3$, MX, MnS, $Ti_4C_2S_2$ | 1.890 | 2.300 | 0.107 | 0.1145 | 8.2 | 40.5 |
| 35 | $M_3C$, MX, $M_2X$, MnS, $Ti_4C_2S_2$ | 1.010 | 2.350 | 0.045 | 0.026 | — | — |
| 36 | $M_3C$, MX, MnS, $Ti_4C_2S_2$ | 0.920 | 2.350 | 0.061 | 0.0365 | — | — |
| 37 | $M_3C$, MX, MnS, $Ti_4C_2S_2$ | 1.020 | 2.550 | 0.189 | 0.199 | — | — |
| 38 | $M_3C$, MX, MnS, $Ti_4C_2S_2$ | 4.330 | 2.600 | 0.172 | 0.0965 | 7.7 | 39.8 |
| 39 | $M_3C$, MX, MnS, $Ti_4C_2S_2$ | 4.760 | 2.600 | 0.129 | 0.0675 | 7.3 | 37.2 |
| 40 | $M_3C$, MX, MnS, $Ti_4C_2S_2$ | 0.330 | 2.750 | 0.102 | 0.126 | — | — |
| 41 | $M_3C$, MX, MnS, $Ti_4C_2S_2$ | 1.120 | 3.500 | 0.027 | 0.0155 | — | — |
| 42 | $M_3C$, MX, MnS, $Ti_4C_2S_2$ | 1.510 | 3.550 | 0.063 | 0.063 | — | — |

In $M_3C$ and $M_7C_3$, M represents Fe and/or alloying element.
In MX and $M_2X$, M represents Ti, V, and/or Nb; and X represents C and/or N.

Next, each 150 kg of the hot-rolled steel wire coils was subjected to drawing and scalping. Specifically, the obtained hot-rolled steel wires were subjected to acid pickling to remove scales, a film of zinc phosphate as a lubricating coat was formed on the surface of the steels, the steels were drawn at a total reduction of area of 14.7% to 21.7% according to the wire diameters before and after drawing, were subjected to scalping and thereby yielded drawn steel wires having a diameter of 11.5 to 12.5 mm. The drawing was conducted at a drawing rate of 70 m/min. The cold workability (workability in pre-working) was evaluated depending on the presence or absence of breakage during cold working processes (drawing and scalping).

The drawn steel wires were then subjected to quenching/tempering using an electric furnace or induction heating furnace. The conditions (heating temperature in quenching and heating temperature in tempering) herein were adjusted so that the tensile strengths after tempering are within the rage of 1900 to 2200 MPa. The drawn steels after quenching/tempering were subjected to a tensile test as follows.

TENSILE TEST

Each fifty pieces of cut pieces 400 mm cut from the steels after quenching/tempering were sampled as samples for tensile test. In the tensile test, the tensile strength and the reduction of area were determined at a chuck interval of 150 mm and a crosshead speed of 10 mm/min. The fifty samples of each of the steels were subjected to the tensile test, and the quality stability was evaluated based on the minimums of the tensile strength and reduction of area. Specifically, samples having a minimum tensile strength of 1900 MPa or more and a minimum reduction of area of 20% or more are evaluated as excellent in quality stability, and those having a minimum tensile strength of 1900 MPa or more and a minimum reduction of area of 30% or more are evaluated are evaluated as more excellent in quality stability.

These results are shown in Table 4.

TABLE 4

| Sample No. | Reduction of area in drawing % | Breakage during cold working | Heating furnace in quenching/tempering | Heating temperature in quenching (T3) ° C. | Heating temperature in tempering (T4) ° C. | Minimum tensile strength (TSmin) MPa | Minimum reduction of area (RAmin) % |
|---|---|---|---|---|---|---|---|
| 1 | 14.7 | no | Electric furnace | 950 | 420 | 1951 | 45 |
| 2 | 21.7 | no | Electric furnace | 950 | 420 | 1947 | 45 |
| 3 | 14.7 | yes | — | — | — | — | — |
| 4 | 14.7 | no | Electric furnace | 950 | 420 | 1888 | 12 |
| 5 | 14.7 | no | Electric furnace | 950 | 420 | 1942 | 46 |
| 6 | 21.7 | no | Electric furnace | 950 | 420 | 1936 | 27 |

TABLE 4-continued

| Sample No. | Reduction of area in drawing % | Breakage during cold working | Heating furnace in quenching/tempering | Heating temperature in quenching (T3) °C. | Heating temperature in tempering (T4) °C. | Minimum tensile strength (TSmin) MPa | Minimum reduction of area (RAmin) % |
|---|---|---|---|---|---|---|---|
| 7  | 14.7 | no  | Electric furnace   | 950  | 420 | 1874 | 12 |
| 8  | 14.7 | no  | Induction heating  | 1000 | 470 | 1921 | 48 |
| 9  | 14.7 | no  | Electric furnace   | 950  | 450 | 1965 | 38 |
| 10 | 21.7 | no  | Electric furnace   | 950  | 450 | 1960 | 39 |
| 11 | 14.7 | no  | Induction heating  | 980  | 490 | 1972 | 40 |
| 12 | 14.7 | no  | Induction heating  | 980  | 520 | 2008 | 43 |
| 13 | 14.7 | yes | —                  | —    | —   | —    | —  |
| 14 | 14.7 | no  | Induction heating  | 980  | 520 | 2021 | 42 |
| 15 | 14.7 | no  | Electric furnace   | 950  | 420 | 2031 | 35 |
| 16 | 21.7 | no  | Electric furnace   | 950  | 420 | 2022 | 36 |
| 17 | 14.7 | no  | Electric furnace   | 950  | 420 | 1916 | 10 |
| 18 | 14.7 | yes | —                  | —    | —   | —    | —  |
| 19 | 14.7 | no  | Induction heating  | 980  | 520 | 2017 | 40 |
| 20 | 14.7 | no  | Induction heating  | 980  | 520 | 2020 | 28 |
| 21 | 14.7 | no  | Induction heating  | 1000 | 540 | 2013 | 38 |
| 22 | 14.7 | no  | Induction heating  | 980  | 540 | 2168 | 35 |
| 23 | 14.7 | no  | Induction heating  | 980  | 560 | 2155 | 34 |
| 24 | 14.7 | no  | Induction heating  | 980  | 520 | 2053 | 38 |
| 25 | 14.7 | no  | Induction heating  | 980  | 520 | 1921 | 10 |
| 26 | 14.7 | yes | —                  | —    | —   | —    | —  |
| 27 | 14.7 | no  | Induction heating  | 1000 | —   | 1788 | 15 |
| 28 | 20.3 | yes | —                  | —    | —   | —    | —  |
| 29 | 14.7 | no  | Electric furnace   | 950  | 420 | 1945 | 16 |
| 30 | 21.7 | yes | —                  | —    | —   | —    | —  |
| 31 | 14.7 | no  | Induction heating  | 1000 | 470 | 1957 | 17 |
| 32 | 21.7 | yes | —                  | —    | —   | —    | —  |
| 33 | 14.7 | yes | Electric furnace   | 950  | 450 | 1982 | 10 |
| 34 | 21.7 | yes | —                  | —    | —   | —    | —  |
| 35 | 14.7 | yes | —                  | —    | —   | —    | —  |
| 36 | 14.7 | yes | —                  | —    | —   | —    | —  |
| 37 | 14.7 | yes | —                  | —    | —   | —    | —  |
| 38 | 14.7 | yes | Induction heating  | 980  | 470 | 2011 | 17 |
| 39 | 20.3 | yes | Induction heating  | 980  | 470 | 2024 | 18 |
| 40 | 14.7 | yes | —                  | —    | —   | —    | —  |
| 41 | 14.7 | yes | —                  | —    | —   | —    | —  |
| 42 | 14.7 | yes | —                  | —    | —   | —    | —  |

Tables 1 to 4 show the following considerations. The numbers herein below are Samples Numbers in Tables 1 to 4. The samples of Nos. 1, 2, 5, 6, 8 to 12, 14 to 16, and 19 to 24 satisfying the requirements specified in the present invention do not invite breakage during cold working and show stable properties without deterioration after quenching/tempering.

In contrast, the samples not satisfying the requirements in the present invention invite breakage during cold working or, if not inviting breakage, show impaired properties after quenching/tempering. Specifically, the samples of Nos. 27 to 42 (Steel Nos. A15 to A27) have compositions not satisfying the requirements of the present invention, cannot inhibit breakage due to supercooling or control precipitates and show poor ductility. Among them, the sample No. 27 has insufficient strength, and the samples of Nos. 29 and 31 have poor ductility and cannot ensure sufficient fatigue resistance of springs. The sample No. 33 has a low reduction of area and the resulting product may undergo fracture at an early stage.

Samples of Nos. 3, 4, 7, 13, 17, 18, 25, and 26 use steels having compositions satisfying the requirements but do not undergo cooling control under the recommended conditions and thereby show supercooling and/or deteriorated properties.

Among them, the samples of Nos. 4, 7, 17, and 25 have low reductions of area, and the resulting products may undergo fracture at an early stage.

Figure 2:
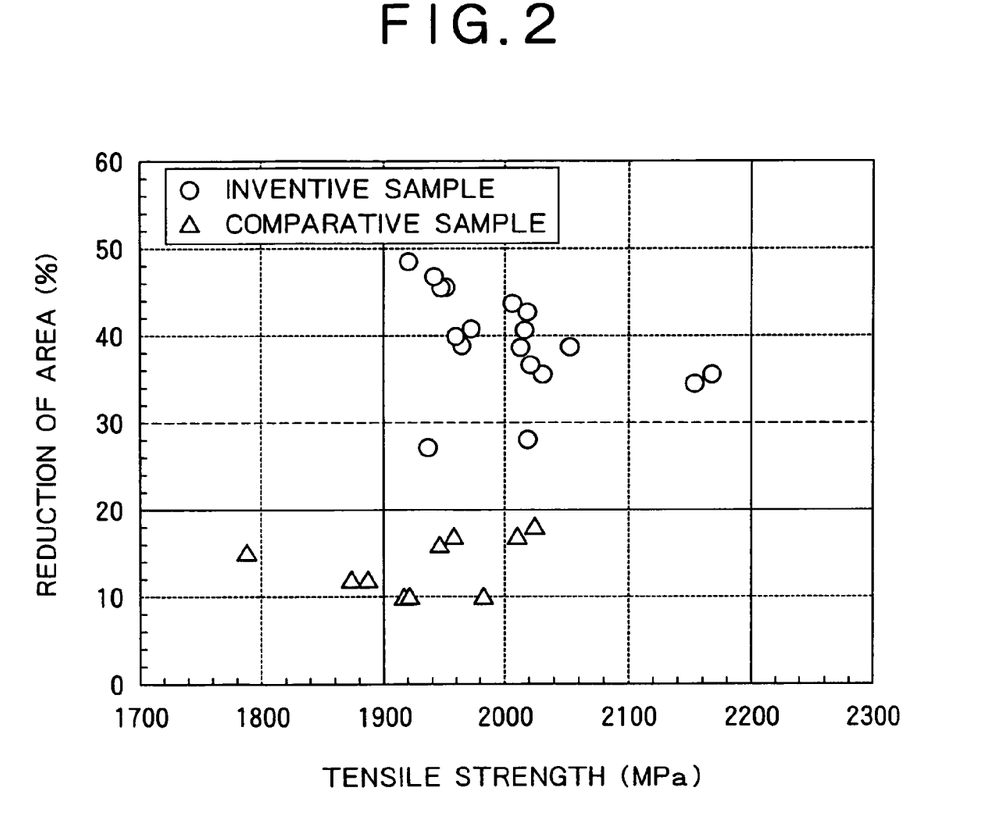
FIG. 2 is a graph showing the relationship between the tensile strength and the reduction of area in the examples.

FIG. 2 is a graph showing the relationship between the tensile strength and the reduction of area as obtained in the above experimental example. FIG. 2 shows that the steels for springs according to the present invention each show a high tensile strength and a high reduction of area even after quenching/tempering, showing that they have highly stable quality.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:
1. A steel obtained by
   hot rolling, at a starting temperature of 1500° C. to 1250°
      C., a steel composition comprising:
      0.35 to 0.65 percent by mass of C,
      1.4 to 2.5 percent by mass of Si,
      0.1 to 1.0 percent by mass of Mn,
      2.0 percent by mass or less (exclusive of 0 percent by mass) of Cr,
      1.0 percent by mass or less (exclusive of 0 percent by mass) of Ni,
      1.0 percent by mass or less (exclusive of 0 percent by mass) of Cu,

0.020 percent by mass or less (exclusive of 0 percent by mass) of P, 0.020 percent by mass or less (exclusive of 0 percent by mass) of S, 0.006 percent by mass or less (exclusive of 0 percent by mass) of N, and 0.1 percent by mass or less (exclusive of 0 percent by mass) of Al, with the remainder being iron and inevitable impurities, cooling the hot rolled steel composition, from a starting temperature of 900-1050° C., to 650° C. at an average rate of 2-20° C./sec, and holding the cooled steel composition at 580-650° C. for 100-1200 seconds, wherein Wp(Fe) and W(C) satisfy the following condition: Wp(Fe)>5×W(C), wherein Wp(Fe) is the content of Fe (percent by mass) constituting Fe-containing precipitates in the steel; and W(C) is the carbon content (percent by mass) of the steel; and the steel obtained has a tensile strength of 1900 MPa or more.

2. The steel of claim 1, comprising bcc-Fe crystal grains in a metallographic structure having an average grain size Dave of 20 μm or less and a largest grain size Dmax of 80 μm or less.

3. The steel of claim 1, further comprising at least one selected from the group consisting of:

0.1 percent by mass or less (exclusive of 0 percent by mass) of Ti, 0.3 percent by mass or less (exclusive of 0 percent by mass) of V, and 0.1 percent by mass or less (exclusive of 0 percent by mass) of Nb, wherein Wp(M) and W(M) satisfy the following condition: Wp(M)>0.5×W(M), wherein Wp(M) is the total content of Ti, V and Nb (percent by mass) constituting (Ti,V,Nb)-containing precipitates in the steel; and W(M) is the total content of Ti, V and Nb (percent by mass) of the steel.

4. The steel of claim 2, further comprising at least one selected from the group consisting of:

0.1 percent by mass or less (exclusive of 0 percent by mass) of Ti, 0.3 percent by mass or less (exclusive of 0 percent by mass) of V, and 0.1 percent by mass or less (exclusive of 0 percent by mass) of Nb, wherein Wp(M) and W(M) satisfy the following condition: Wp(M)>0.5×W(M), wherein Wp(M) is the total content of Ti, V and Nb (percent by mass) constituting (Ti,V,Nb)-containing precipitates in the steel; and W(M) is the total content of Ti, V and Nb (percent by mass) of the steel.

5. The steel of claim 1, further comprising at least one of 0.5 percent by mass or less (exclusive of 0 percent by mass) of Mo and 0.001 percent by mass or less (exclusive of 0 percent by mass) of B.

6. The steel of claim 2, further comprising at least one of 0.5 percent by mass or less (exclusive of 0 percent by mass) of Mo and 0.001 percent by mass or less (exclusive of 0 percent by mass) of B.

7. The steel of claim 3, further comprising at least one of 0.5 percent by mass or less (exclusive of 0 percent by mass) of Mo and 0.001 percent by mass or less (exclusive of 0 percent by mass) of B.

8. The steel according to claim 1, wherein the steel obtained has a tensile strength of 1900 to 2200 MPa.

\* \* \* \* \*